United States Patent [19]

Drzewiecki et al.

[11] 4,108,721
[45] Aug. 22, 1978

[54] AXISYMMETRIC FLUIDIC THROTTLING FLOW CONTROLLER

[75] Inventors: Tadeusz M. Drzewiecki, Silver Spring; Francis M. Manion, Rockville, both of Md.

[73] Assignee: The United States of America as represented by the Secretary of the Army, Washington, D.C.

[21] Appl. No.: 806,438

[22] Filed: Jun. 14, 1977

[51] Int. Cl.² .............................................. G21C 7/16
[52] U.S. Cl. .............................. 176/36 R; 176/86 R; 137/810; 137/828
[58] Field of Search ..................... 176/61, 36 R, 86 R; 137/801, 825, 828

[56] References Cited

U.S. PATENT DOCUMENTS

| 3,400,047 | 9/1968 | Howard | 176/61 |
| 3,442,278 | 5/1969 | Petersen | 137/828 |
| 3,479,250 | 11/1969 | Ripley | 176/36 R |
| 3,486,975 | 12/1969 | Ripley | 176/36 R |
| 4,076,583 | 2/1978 | Ash et al. | 176/86 R |

Primary Examiner—Harvey E. Behrend
Attorney, Agent, or Firm—Nathan Edelberg; Robert P. Gibson; Saul Elbaum

[57] ABSTRACT

A fluidic throttling flow controller for controlling core cooling flow in a nuclear reactor. Increased temperature of cooling flow adajcent the core increases the flow adjacent the core and is used to control a focused jet amplifier which in turn controls a vortex valve to reduce flow and shut down the reactor when overheating occurs.

8 Claims, 2 Drawing Figures

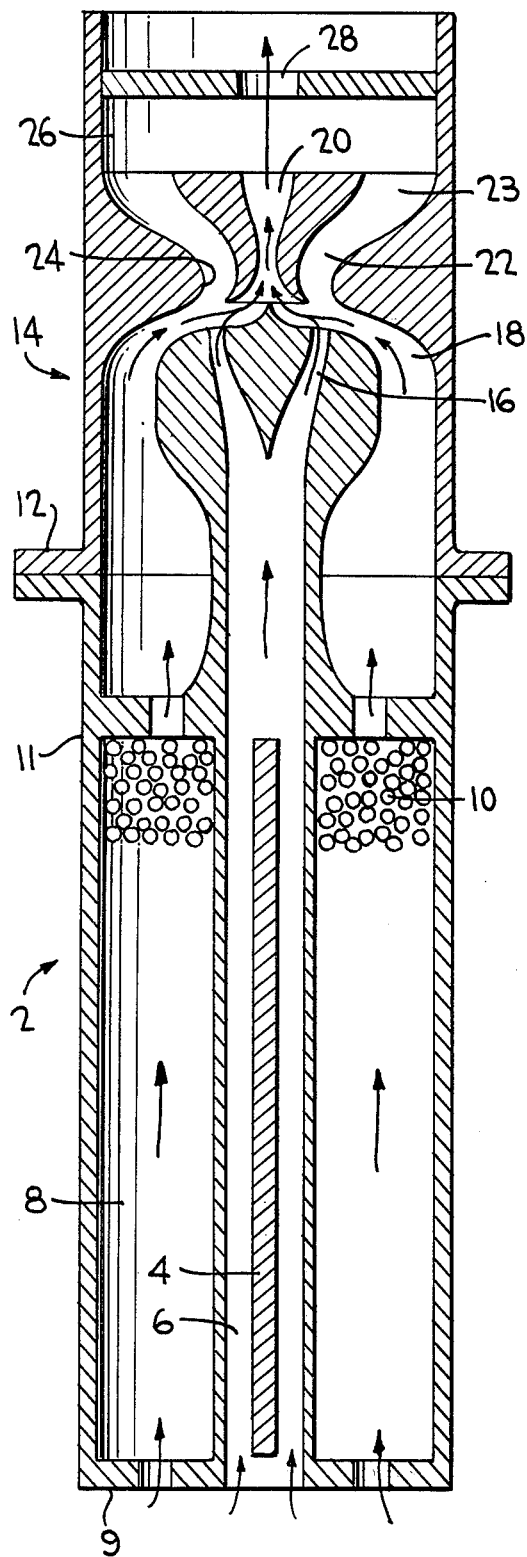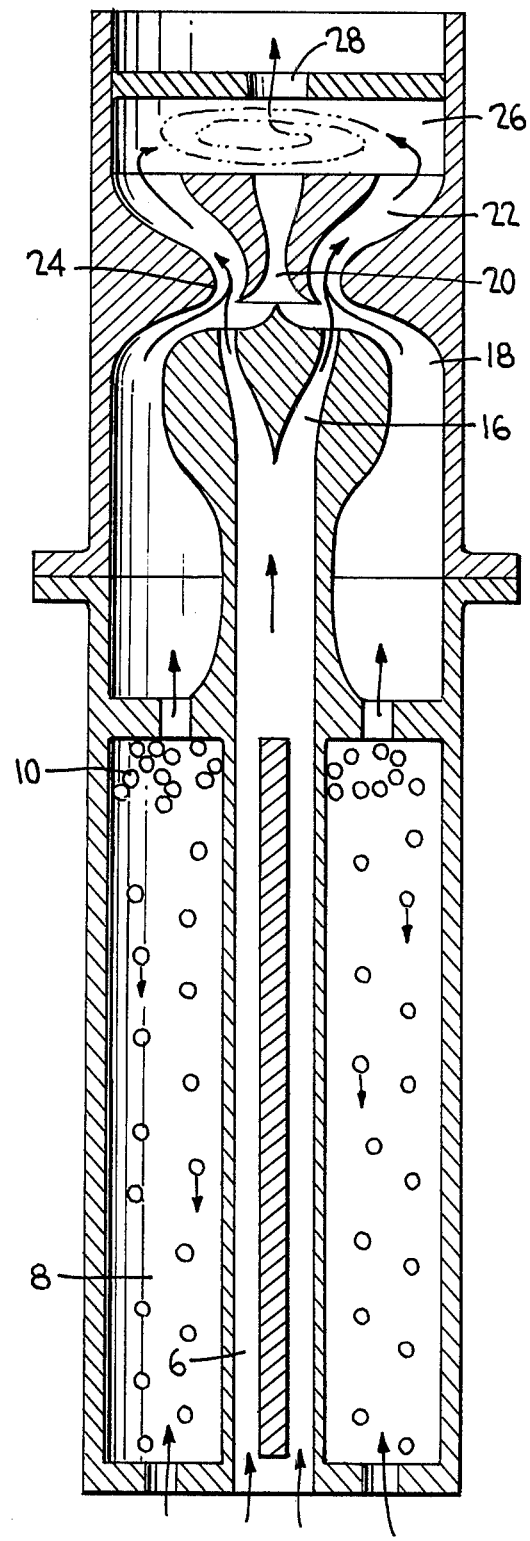

AXISYMMETRIC FLUIDIC THROTTLING FLOW CONTROLLER

RIGHTS OF THE GOVERNMENT

The invention described herein may be manufactured, used and licensed by or for the U.S. Government for governmental purposes without the payment to us of any royalty thereon.

BACKGROUND OF THE INVENTION

The development of the Liquid Metal Fast Breeder Reactor LMFBR requires a highly reliable method of controlling the liquid sodium cooling flow through the reactor core. One such reactor would use an annular flow of sodium adjacent the uranium core and a surrounding annular flow of sodium through a fluidized bed of tantalum spheres. The tantalum spheres serve to poison the nuclear reaction when they drop because of a substantially reduced flow of sodium. A satisfactory controller for such a reactor must reduce the flow through the fluidized bed to drop the tantalum balls and poison the reaction in the following two critical situations: (1) when the flow in the reactor decreases, e.g., due to pump failure and (2) when the temperature of the liquid sodium increases, e.g., due to excessive power generation.

SUMMARY OF THE INVENTION

It is, therefore, an object of the instant invention to provide a fluidic controller for an LMFBR which can reduce the flow through the fluidized bed of tantalum balls and shut down the reactor in the aforementioned two critical situations.

It is a further object of the invention to provide such a controller having no moving parts to achieve the requisite reliability.

Briefly, in accordance with the instant invention, a nuclear reactor core surrounded by an inner annular liquid sodium cooling flow and an outer annular sodium flow which suspends a bed of tantalum "poison" balls is controlled by a focused jet amplifier driving a vortex valve. The inner annular cooling flow acts as the control jet and the outer flow as the supply jet in the amplifier. Any excess heating of the inner cooling flow, whether caused by reduced flow or excess power generation will cause the amplifier to switch its output to the tangential jets of the vortex valve and sharply reduce the flow. This will cause the tantalum balls to drop out of suspension and shut down the reactor.

Additional objects, features, and advantages of the instant invention will become apparent to those skilled in the art from the following detailed description and attached drawings on which, by way of example, only the preferred embodiment of the instant invention is illustrated.

BRIEF DESCRIPTION OF THE DRAWINGS

FIG. 1 is a cross section of the reactor core and controller of the invention showing the flow pattern when the reactor is operating.

FIG. 2 is a view like FIG. 1 showing the flow pattern when the reactor is shutdown by the controller.

DESCRIPTION OF THE PREFERRED EMBODIMENT

Referring to FIG. 1 there is shown a reactor core section 2. At the center of the section is uranium heating rod element 4 which is surrounded by annular cooling flow passage 6. Outside of cooling flow passage 6 is an annular fluidized bed flow passage 8 housing a quantity of tantalum "poison" balls 10. At both ends of the fluidized bed retaining studs 9 and 11 are provided to prevent the balls from leaving the core passage.

Attached to core section 2 by flange 12 is the axisymmetric fluidic throttling flow controller 14. Flow controller 14 includes a focused jet amplifier and a vortex valve. The amplifier has an annular control passage 16 connected directly to the core cooling passage 6 and an annular supply passage 18 connected to the fluidized bed 8. The amplifier has a central outlet 20 which extends to form a central axial inlet to vortex chamber 26 and has tangential outlets 22. Tangential outlets 22 lead to tangential nozzles 23 which are arranged to give a tangential component of velocity to flow passing through them in order to create vortex flow in vortex chamber 26. At the top of vortex chamber 26 vortex drain 28 is provided. Except for tangential nozzles 23, the controller is axisymmetric.

The reactor is designed to operate with liquid sodium as a coolant. The sodium coolant enters the core section at the bottom. At normal operating flow and temperature, there is sufficiently more flow through fluidized bed flow passage 8 than through cooling flow passage 6 so that the annular supply flow at 18 merely focuses at the center and leaves the amplifier by central outlet 20 as illustrated by the arrows in FIG. 1. It is noted that the uranium rod heats the control fluid that passes through passage 16 so it is hotter than the supply fluid in passage 18.

When the system overheats (a condition of too much reactor power) the flow is as shown in FIG. 2. The resistance to flow in the annular control passage 16 decreases due to the decreased fluid viscosity of the liquid sodium at higher temperatures. Since the flow resistance of supply passage 18 is much lower than that of control passage 16 because of a relatively close fit around uranium rod 4, the change in supply flow is negligible compared to that of the control flow. Thus the output of the amplifier may be switched from central outlet 20 to tangential outlets 22. When the flow is switched to tangential outlets 22, tangential nozzles 23 cause the flow to form a vortex in vortex chamber 26 thus causing a sharp increase in overall flow resistance in the flow controller and a corresponding decrease in flow through cooling and fluidized bed passages 6 and 8. This then initiates the falling of the tantalum "poison" since balls 10 can no longer be supported by the flow. The reduced flow also heats the control fluid even more so that while balls 10 are falling and the supply flow resistance temporarily decreases there is a stronger control signal to keep the supply jet diverted. The placement of attachment surface 24 in tangential outlet 22 serves to provide hysteresis so that even if the control flow should not be sufficient for switching, once switched a much lower signal can keep the device switched. This is normally called "memory". Once balls 10 have fallen, the resistance is higher again so the control signal is more than enough to keep the flow throttled, and the reactor is shut down.

If an underflow condition occurs (e.g., if a pump fails) the flow must again switch to the state shown in FIG. 2 before overheating occurs. Thus the controller must throttle the flow at a given reduced level of flow. This occurs because the flow in cooling passage 6, as it decreases, absorbs more heat from uranium rod 4, and its viscosity again decreases, causing a larger percentage of control flow to that of supply flow in the focused jet amplifier. This causes switching from central outlet 20 to tangential outlet 22 and thus throttling of the flow. Again hysteresis due to attachment surface 24 and decreased control resistance provide enough margin to overcome the reduced supply resistance during the short period when balls 10 are falling.

In general, it is noted that the design is axisymmetric and requires no additional channels for diverted flow. It utilizes only the fluid properties of the working fluid to do all controlling functions. It is fluidic, has no moving parts and should be several orders of magnitude more reliable than any mechanical scheme. Though the axisymmetry of the device provides advantages, since it can be manufactured on a lathe and symmetry is relatively easy to maintain, the controller could take other forms.

We wish it to be understood that we do not desire to be limited to the exact details of construction shown and described, for obvious modifications can be made by a person skilled in the art.

We claim:

1. A fluidic throttling flow controller and nuclear reactor core assembly for controlling the cooling flow from first and second core cooling passages in a nuclear reactor wherein a poison material located in said first passage is movable by means of coolant flow between a reactor shutdown position and a non-shutdown position, said posion material being movable to said shutdown position when a substantially reduced flow occurs in said first passage, a fluid amplifier including a main jet supplied by said first passage, a control jet supplied by said second passage, a central output, a tangential output, and means to switch flow from said central output to said tangential output when the temperature of the flow through said second passage exceeds a desired switching value; and a vortex valve including a central inlet connected to receive fluid from said central output of said fluid amplifier, tangential control ports connected to receive fluid from said tangential output and produce vortex flow in said vortex chamber when the flow from said fluid amplifier is switched to said tangential output, and a vortex drain;

whereby flow through said flow controller and core assembly is substantially reduced when the temperature of the flow through said second passage exceeds said desired value, and said poison material thereby falls to said shutdown position.

2. The device of claim 1 wherein said first and second cooling passages are concentric annular passages with a nuclear heating rod at the center, and second cooling passage being inside said first passage, and said main jet and said control jet are annular and aligned with said first and second cooling passages, respectively.

3. The device of claim 2 wherein said central output is aligned with the longitudinal axis of said heating rod and said tangential output is annular and positioned around said central output.

4. The device of claim 3 wherein said means to switch flow further includes a flow attachment surface so that a temperature lower than said switching value will keep said flow switched to said tangential output.

5. The fluidic throttling controller of claim 1 wherein said main jet and said control jet are coaxial and both of said jets are annular.

6. The fluidic controller of claim 5 wherein said control jet is radially inward of said supply jet.

7. The controller of claim 6 wherein said central output is located on said axis.

8. The controller of claim 7 wherein said tangential output is annular and positioned around said central output.

* * * * *